United States Patent
Yang et al.

(10) Patent No.: US 12,290,776 B2
(45) Date of Patent: May 6, 2025

(54) AIR CLEANER

(71) Applicant: LG Electronics Inc., Seoul (KR)

(72) Inventors: Taeman Yang, Seoul (KR); Joonmin Park, Seoul (KR); Choonmyun Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 971 days.

(21) Appl. No.: 17/371,716

(22) Filed: Jul. 9, 2021

(65) Prior Publication Data

US 2022/0008856 A1 Jan. 13, 2022

(30) Foreign Application Priority Data

Jul. 10, 2020 (KR) .................. 10-2020-0085479

(51) Int. Cl.
*B01D 46/00* (2022.01)
*B01D 46/24* (2006.01)
*B01D 46/60* (2022.01)

(52) U.S. Cl.
CPC ..... *B01D 46/0049* (2013.01); *B01D 46/2403* (2013.01); *B01D 46/60* (2022.01); *B01D 2273/30* (2013.01)

(58) Field of Classification Search
None
See application file for complete search history.

(56) References Cited

U.S. PATENT DOCUMENTS

| 10,495,104 | B2 * | 12/2019 | Park | B01D 46/2403 |
| 2010/0111667 | A1 * | 5/2010 | Stagg | F04D 29/441 |
| | | | | 415/191 |
| 2019/0264948 | A1 * | 8/2019 | Jung | A61L 2/22 |
| 2021/0285686 | A1 * | 9/2021 | Park | F04D 25/08 |

FOREIGN PATENT DOCUMENTS

| CN | 105987022 | 10/2016 |
| CN | 106989448 | 7/2017 |
| CN | 206478797 | 9/2017 |
| CN | 109477490 | 3/2019 |

(Continued)

OTHER PUBLICATIONS

European Search Report in European Appln. No. 21184792.6, dated Dec. 10, 2021, 7 pages.

(Continued)

*Primary Examiner* — Brit E. Anbacht
(74) *Attorney, Agent, or Firm* — Fish & Richardson P.C.

(57) ABSTRACT

An air cleaner includes: a blower having an outlet formed on an upper side thereof; a circulator disposed over the blower and configured to control a wind direction of air flowing upwardly through the outlet; and a mover coupled to the circulator and configured to change an arrangement of the circulator, wherein the circulator includes: a lower cover having a lower plate coupled to the mover, and having an inlet formed around the lower plate; an upper cover disposed over the lower cover and having an outlet; a blower fan rotatably disposed between the lower cover and the upper cover, and having a circular inlet formed on a lower side and an annular outlet formed on an upper side; and a motor disposed on an upper side of the lower plate, and rotating the blower fan.

22 Claims, 11 Drawing Sheets

(56) References Cited

FOREIGN PATENT DOCUMENTS

| EP | 3211345 | A1 | * | 8/2017 | ............... | A61L 2/22 |
|----|---------|----|---|--------|-----------------|-----------|
| EP | 3273063 | | | 1/2018 | | |
| EP | 3879112 | A1 | * | 9/2021 | ............ | F04D 17/06 |
| KR | 20020085626 | | | 11/2002 | | |
| KR | 20200072033 | | | 6/2020 | | |
| WO | WO2019190112 | | | 10/2019 | | |
| WO | WO-2019194637 | A1 | * | 10/2019 | ........... | F04D 29/281 |
| WO | WO2020089581 | | | 5/2020 | | |

OTHER PUBLICATIONS

Office Action in Chinese Appln. No. 202110776863.8, dated Sep. 2, 2022, 15 pages (with English translation).

* cited by examiner

AIR CLEANER

CROSS-REFERENCE TO RELATED APPLICATION

This application claims priority to and the benefit of Korean Patent Application No. 10-2020-0085479, filed on Jul. 10, 2020, the disclosure of which is incorporated herein by reference in its entirety.

BACKGROUND OF THE INVENTION

1. Field of the Invention

The present disclosure relates to an air cleaner, and more particularly to an air cleaner having a circulator formed on an upper side thereof and configured to control a flow direction of clean air.

2. Description of the Related Art

An air cleaner is a device for filtering air and discharging the filtered air to a room to reduce dust and bacteria in the air of the room. The air cleaner filters out foreign matter by generating a flow of air in a room, and discharges air from which the foreign matter is removed.

There is disclosed a structure in which an inlet is formed on a circumferential surface of a cylindrical case in order to draw in air over a large area of a corresponding space and to discharge filtered air, and the filtered air is discharged upwardly. However, in order to discharge the filtered air to a distant area in the corresponding space, a separate device is provided for changing an air flow direction to an upward direction in which the filtered air is discharged, thereby discharging the filtered air to a large area of a room.

Korean Laid-Open Patent Publication No. KR10-2018-0000121 discloses a blower for causing air to flow upwardly from a circumferential surface of a lower side thereof, and a flow switching device for switching a flow of air discharged upwardly.

The flow switching device has a structure which is coupled to the blower with a closed center portion, such that an axial flow fan having an annular inlet is used therein. The flow switching device having the axial flow fan may circulate air in a specific space by controlling the RPM to discharge a desired volume of air. However, if an area of a discharged passage is reduced, an air volume may be reduced, and when the air passes through grills without separate vanes, energy loss of the flow may occur.

Unlike the related air, if a mixed flow fan and a vane structure are applied to the flow switching device, a motor is disposed on an upper side of a blower fan, such that it is difficult for a user to separate the blower fan to manage the fan.

In addition, in the related art, an outlet formed in the blower has an annular shape. Accordingly, as the flow switching device draws in and discharges the air flowing through the annular outlet, there may be an area where the flow of air is blocked at a center portion of the flow switching device.

SUMMARY OF THE INVENTION

It is an object of the present disclosure to provide an air cleaner capable of discharging filtered clean air to a distant area in a radial direction.

Air may flow to a distant location by using a mixed flow fan having a circular inlet and mounted in a circulator. However, the circulator of the present disclosure is coupled to a mover so as to be changed in position, such that the inlet of the circulator may be partially closed. It is another object of the present disclosure to provide an air cleaner capable of minimizing a loss of air flow volume in a structure in which the inlet of the circulator is partially closed. It is yet another object of the present disclosure to provide an air cleaner capable of minimizing the formation of a vortex while the air, drawn into the circulator, flows to the inlet of a blower fan.

It is still another object of the present disclosure to provide an air cleaner capable of maximizing a flow volume of air drawn in through the inlet of the blower fan.

The circulator having the mixed flow fan has a problem in that a motor is disposed at an upper side thereof, such that it is difficult for a user to separate the circulator including the blower fan and to manage the fan. It is still another object of the present disclosure to provide an air cleaner, in which by changing an arrangement of a motor in the structure of a mixed flow fan, a user may easily manage the air cleaner. It is still another object of the present disclosure to provide an air cleaner capable of stably driving the circulator which is changed in position at an upper side of the blower.

It is still another object of the present disclosure to provide an air cleaner capable of optimizing the use of an internal space of the circulator in a structure in which the motor and the blower fan are disposed in the circulator. In addition, it is still another object of the present disclosure to provide an air cleaner capable of maximizing the use of an internal space of the circulator, so that the circulator may be produced with a minimum height.

It is still another object of the present disclosure to provide an air cleaner capable of preventing overheating of the motor by providing the motor at the inlet of the blower fan where air flows dynamically.

The objects of the present disclosure are not limited to the aforementioned objects and other objects not described herein will be clearly understood by those skilled in the art from the following description.

In accordance with an aspect of the present disclosure, the above and other objects can be accomplished by providing an air cleaner, including: a blower configured to discharge air upwardly; and a circulator disposed over the blower and configured to control a wind direction of air, wherein the circulator includes: a lower cover having an inlet formed around the lower plate; an upper cover disposed over the lower cover and having an outlet; and a blower fan rotatably disposed between the lower cover and the upper cover, and having a circular inlet formed on a lower side and an annular outlet formed on an upper side.

In order to achieve the above objects, the circulator may include a motor disposed on an upper side of the lower plate and rotating the blower fan, such that by mounting the motor in a region covered by the lower plate coupled to a mover, it is possible to prevent a vortex from forming above the lower plate.

In addition, the circulator may further include a motor cover disposed around the motor, and guiding air, drawn in through the inlet formed in the lower cover, toward the blower fan. Accordingly, the motor and the motor cover are disposed in a space in which the inlet of the blower fan is formed, such that a lower space of the blower fan may be used, and the air flowing to the blower fan may be guided by the arrangement of the motor cover.

The blower fan may include: a hub coupled to the motor; a shroud spaced apart from the hub, and having an inlet which is formed at a center portion and through which air is drawn in; and a plurality of blades disposed between the hub and the shroud, wherein the motor cover may be disposed at the inlet formed in the shroud, and may guide the air, flowing through the inlet formed in the shroud, toward the hub, such that a suction space of a mixed flow fan may be used to mount the motor therein, and the suctioned air may be guided by using the motor cover for receiving the motor.

The hub may include: an inner hub being upwardly convex to form a space in which the motor, disposed under the hub, is disposed; and an outer hub extending radially from the inner hub and inclined upwardly, wherein an upper end of the blades may be coupled to a lower surface of the outer hub, and a lower end thereof may be coupled to an upper surface of the shroud. Unlike the existing hub, the hub of the present disclosure is composed of the inner hub and the outer hub, and the blades are disposed in the outer hub forming an air flow.

An outer circumferential end of the shroud may be disposed below an inner circumferential end of the outer hub. A lower end of the existing hub of a mixed flow fan is positioned below an outer circumferential end of the shroud, but in the present disclosure, a space for mounting the motor is formed under the inner hub, such that an arrangement of an inner circumferential end of the outer hub is adjusted.

The motor cover may include a housing forming a space in which the motor is disposed, and an inner plate spaced apart radially outwardly from the housing, and disposed below the shroud, wherein an inlet, through which air flows to the blower fan, is formed between the housing and the inner plate, such that the motor cover has a structure in which while forming a space for receiving the blower fan, the motor cover may guide the air flowing to the inlet of the blower fan.

The housing may have a cylindrical shape; and a diameter of an outer circumferential end of the housing may be smaller than a diameter of an inner circumferential end of the outer hub, such that the housing does not interrupt the flow of air flowing to the inlet of the blower fan.

The housing may include an upper housing disposed on a lower side of the inner hub, and a lower housing disposed under the upper housing, wherein the lower housing may have a greater diameter than the upper housing and may extend downwardly.

The lower housing may be disposed below the hub, so as to guide air, drawn in through the inlet of the lower cover, toward the outer hub, thereby allowing the air to smoothly flow to the blower fan.

A diameter of an outer circumferential end of the lower housing may be smaller than a diameter of an inner circumferential end of the outer hub, such that the lower housing may not interrupt the flow of air flowing to the outer hub.

An upper end of the lower housing may be disposed below the inner circumferential end of the outer hub and above an inner circumferential end of the shroud, such that the air, flowing through the inlet of the lower cover, may flow along the lower housing toward the outer hub.

A distance that the upper end of the lower housing is spaced apart downwardly from the inner circumferential end of the outer hub may be shorter than a distance that the upper end of the lower housing is spaced apart upwardly from the inner circumferential end of the shroud, thereby providing a structure in which after flowing along an outer circumferential surface of the lower housing, the air may flow to the outer hub, rather than the inner hub.

The upper housing may be disposed in a lower space formed by the inner hub, thereby minimizing a space in which a vortex may be formed at a lower side of the blower fan.

The motor cover may include a bell mouth protruding upwardly from an inner circumferential surface of the inner plate, so as to guide air, flowing through the inlet formed in the lower cover, toward the inlet of the blower fan, such that the air flowing through the inlet of the lower cover may flow along the bell mouth to the blower fan.

A diameter formed by an inner circumferential surface of the bell mouth may be greater than a diameter of the inlet formed in the blower fan, such that even when the inlet is partially closed by the lower plate, a flow rate of the air flowing through the inlet of the blower fan may be secured.

The blower fan may include a suction guider protruding downwardly from the inner circumferential end of the shroud, wherein the bell mouth may be spaced apart outwardly from a circumferential surface of the suction guider.

The upper cover may include a cylindrical discharge guider forming an exterior, and a plurality of vanes extending radially inwardly from the discharge guider and guiding air, blown by the blower fan, in an upward direction, such that the discharged air may flow in a direction in which a rotation axis of the blower fan is directed.

The upper cover may further include a connect ring having a ring shape and spaced apart radially inwardly from the discharge guider, wherein the plurality of vanes may be spaced apart from each other in a circumferential direction between the discharge guider and the connect ring, such that the vanes may cancel a rotational component of the air blown by the blower fan.

The discharge guider may have an annular outlet formed therein, wherein a diameter formed by an inner circumferential end of the discharge guider may increase from bottom to top, thereby guiding the air, blown by the blower fan in a radially outward direction, to naturally flow upwardly.

In accordance with another aspect of the present disclosure, the above and other objects can be accomplished by providing an air cleaner, including: a blower having an outlet formed on an upper side thereof; and a circulator disposed over the blower, and configured to control a wind direction of air flowing upwardly through the outlet, wherein the circulator may include: a blower fan having a circular inlet formed on a lower side, and having an annular outlet formed on an upper side; an upper cover disposed over the lower cover, and guiding air, blown by the blower fan, in a direction in which a rotation axis of the blower fan is directed; a motor disposed at the outlet of the blower fan and rotating the blower fan; and a motor cover disposed around the motor, and guiding the air, drawn in through the inlet of the blower fan, toward the blower fan, such that in a structure of a mixed flow fan having a circular inlet formed on a lower side and an annular outlet formed on an upper side, air may be guided by mounting the motor at the inlet side and by using the motor cover.

Other detailed matters of the exemplary embodiments are included in the detailed description and the drawings.

Effects of the Invention

The air cleaner according to the present disclosure has one or more of the following effects.

Firstly, in the air cleaner of the present disclosure, a mixed flow fan, having a circular inlet at a lower side and an annular outlet at an upper side, is used as the blower fan disposed in the circulator, such that filtered clean air may be discharged to a distant location in a radial direction, thereby providing comfort to users in a large area of a space.

Secondly, the circulator of the present disclosure has a structure in that even when a portion where the inlet is formed is partially closed, the motor and the motor cover may guide the suctioned air to the closed region, such that the air drawn in through the inlet of the blower fan may remain above the closed region, thereby preventing a loss of air flow volume, which produces the effect of increasing a volume of clean air.

In addition, by mounting the motor above the region where the inlet of the circulator is partially closed, and by mounting the motor cover for guiding air around the closed region, it is possible to minimize the formation of a vortex above the region where the inlet of the circulator is partially closed.

Thirdly, in the circulator of the present disclosure, the bell mouth for guiding an air flow toward the blower fan is disposed outside of the inlet formed in the shroud, such that a flow rate of the suctioned air may be secured.

Fourthly, the circulator of the present disclosure may have a structure in which the motor is disposed below the mixed flow fan, thereby allowing a user to easily separate an upper side of the circulator, which facilitates management of the circulator.

Fifthly, in the circulator of the present disclosure, the motor is disposed below the blower fan, such that the center of gravity of the circulator is formed at a lower side of the circulator, thereby allowing a stable movement of the circulator which is changed in position.

Sixthly, in a structure in which the outlet of the blower has an annular shape and the circulator includes the mixed flow fan, the motor is disposed below the blower fan such that a central space of the circulator, in which the flow of air is blocked, may be used.

In addition, the blower fan of the present disclosure has a structure in which air flows radially outwardly and upwardly by the hub and the shroud, such that a large effective space may be formed under the hub, and thus the motor may be disposed under the hub, thereby using a space of the circulator and allowing the circulator to be produced with a minimum height.

Seventhly, as the blower fan disposed in the circulator, a mixed flow fan including the hub, shroud, and blades is used, and the motor is disposed under the hub, such that overheating of the motor may be prevented by the air flowing to the blower fan.

The effects of the present disclosure are not limited to the aforesaid, and other effects not described herein will be clearly understood by those skilled in the art from the following description of the appended claims.

DETAILED DESCRIPTION OF THE PREFERRED EMBODIMENTS

Figure 1:
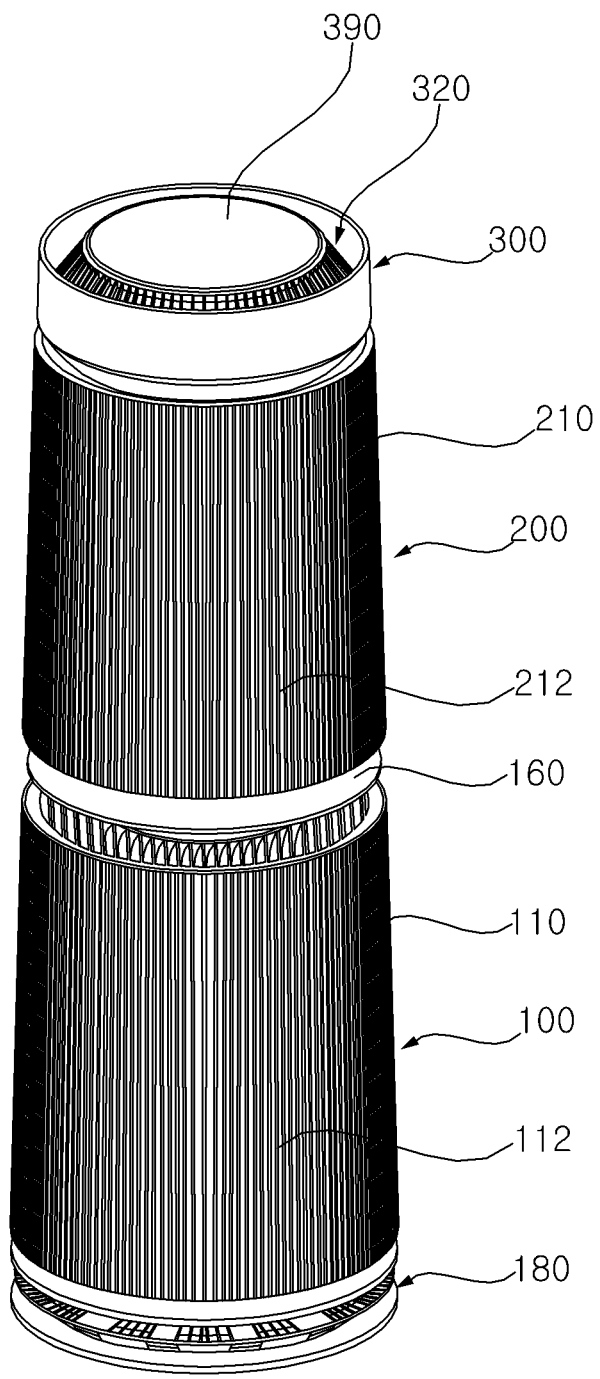
FIG. 1 is a perspective view of an air cleaner according to an embodiment of the present disclosure.

Advantages and features of the present disclosure and methods of accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

As used herein, the terms "first," "second," and "third" are used to distinguish one element from another, regardless of priority or importance.

Hereinafter, embodiments of the present disclosure will be described with reference to the accompanying drawings for explaining an air cleaner.

<Overall Configuration>

Referring to FIG. 1, an air cleaner 10 according to an embodiment of the present disclosure includes blowers 100 and 200 generating an air flow, and a circulator 300 changing a discharge direction of the air flow generated by the blowers 100 and 200. The blowers 100 and 200. The blowers 100 and 200 include a first blower 100 generating a first air flow, and a second blower 200 generating a second air flow.

Figure 2:
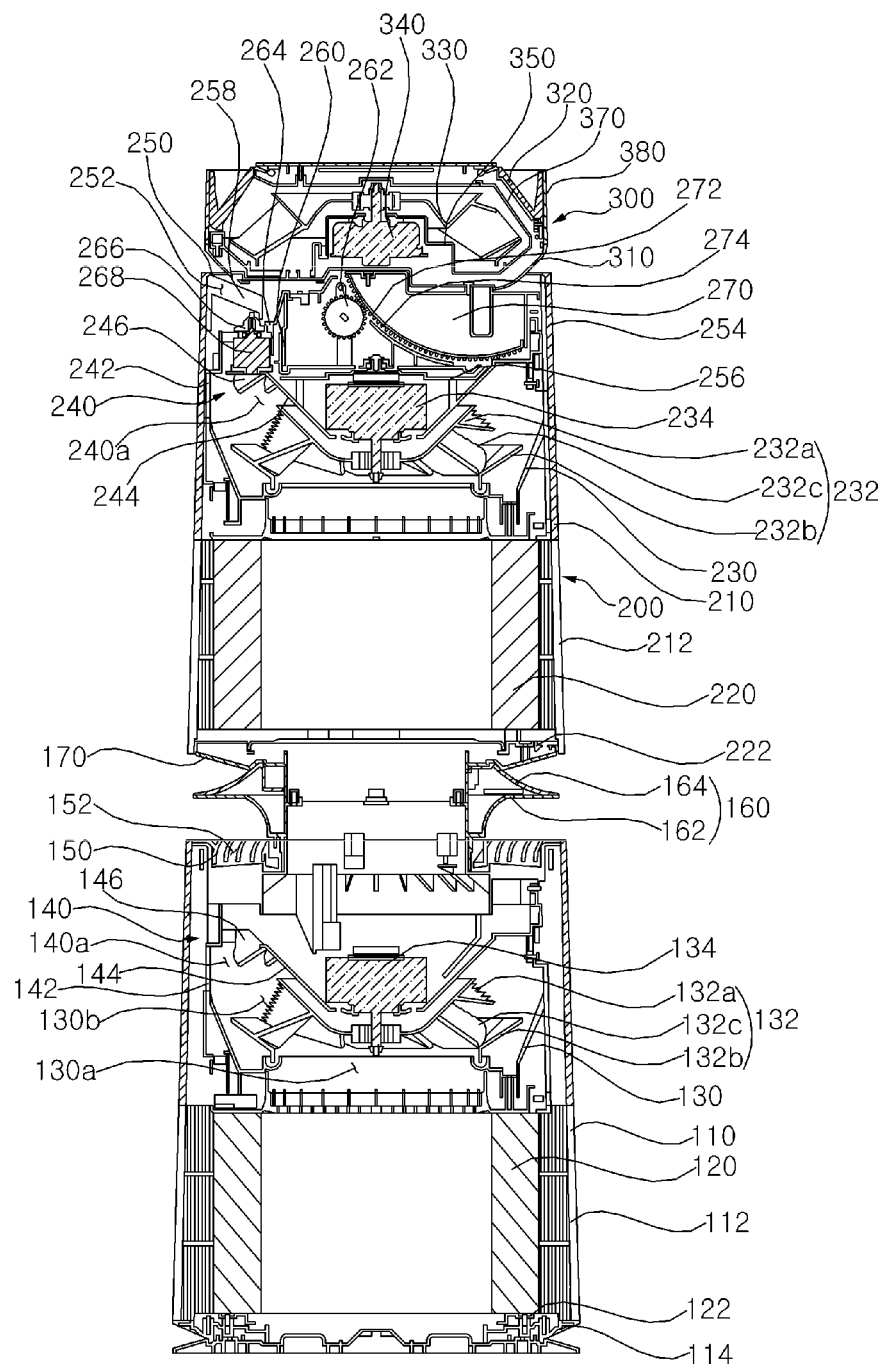
FIG. 2 is a side cross-sectional view of an air cleaner of FIG. 1.

Referring to FIGS. 1 and 2, the first blower 100 and the second blower 200 may be disposed vertically. The second blower 200 may be disposed over the first blower 100.

The air cleaner 10 includes cases 110 and 210 forming the exterior thereof. The cases 110 and 210 include a first case 110 forming the exterior of the first blower 100, and a second case 210 forming the exterior of the second blower 200.

The first case 110 may have a cylindrical shape. An upper portion of the first case 110 may have a diameter which is smaller than a diameter of a lower portion thereof.

The first case 110 may have a first inlet 112, through which air is suctioned. The first inlet 112 may allow the inside and outside of the first case 110 to communicate with each other. A plurality of first inlets 112 may be formed. The first case 110 may have the plurality of first inlets 112 formed on a circumference thereof and may have a first outlet 149 which is open upwardly.

The plurality of first inlets 112 may be elongated vertically. The plurality of first inlets 112 may be arranged evenly in a circumferential direction along an outer circumference of the first case 110, so that air may be suctioned in any direction relative to the first case 110.

As described above, the first case 110 has a cylindrical shape, and the plurality of first inlets 112 are formed along the outer circumference of the first case 110, such that an air suction amount may increase.

A first discharge cover 150, having a first outlet 152 which is open upwardly, may be disposed at an upper portion of the first blower 100. The first outlet 152 may have a ring shape.

A first filter 120 may be removably mounted in a mounting space. The first filter 120 has a cylindrical shape, and air may be introduced through an outer circumferential surface of the first filter 120. Impurities, such as fine dust contained in the air, may be filtered out while the air passes through the first filter 120.

As the first filter 120 has a cylindrical shape, air may be introduced in any direction relative to the first filter 120, thereby increasing an air filtering area.

The mounting space may be formed in a cylindrical shape corresponding to the shape of the first filter 120. While being mounted, the first filter 120 may be slidably inserted into the mounting space. By contrast, while being removed, the first filter 120 may be slidably withdrawn from the mounting space.

The first blower 100 includes: a first fan housing 130 disposed on an upper side of the first filter 120; a first fan 132 rotatably disposed inside the first fan housing 130; and a first fan motor 134 rotating the first fan 132.

The first fan housing 130 has a first housing suction hole 130*a* having a circular shape and formed at a lower portion thereof, and a first housing discharge hole 130*b* having a ring shape and formed at an upper portion thereof. The first fan 132 suctions air in an axial direction and discharges the air in a radially upward direction.

The first fan 132 includes: a first hub 132*a*, to which a rotating shaft of the first fan motor 132 as a centrifugal fan motor is coupled; a first shroud 132*b* spaced apart from the first hub 132*a*; and a plurality of first blades 132*c* disposed between the first hub 132*a* and the first shroud 132*b*. The first fan motor 134 may be coupled to an upper portion of the first fan 132.

The first blower 100 may further include a first blowing guider 140 coupled to the upper portion of the first fan 132, and guiding the air, having passed through the first fan 132, in an upward direction.

The first blowing guider 140 has an annular first air-blowing passage 140*a*, through which the air discharged from the first fan 132 flows.

The first blowing guider 140 may include: a first blower body 142 having a cylindrical shape and forming an exterior thereof; a bowl-shaped first motor cover 144 which is disposed at a center portion of the first blower body 142 and into which the first fan motor 134 is inserted; and a plurality of first guide vanes 146 which are spaced apart from each other in a circumferential direction on the first air-blowing passage 140*a* disposed between the first blower body 142 and the first motor cover 144.

The first blowing guider 140 has the annular first air-blowing passage 140*a* which is formed between the first blower body 142 and the first motor cover 144, and through which the air discharged from the first fan 132 flows.

The plurality of first guide vanes 146 may guide air, discharged from the first fan 132 to the first air-blowing passage 140*a*, in an upward direction. The respective first guide vanes 146 may be formed in a bent plate shape disposed in an upright position close to a vertical direction. The first guide vanes 146 may extend from an outer circumferential surface of the first motor cover 144 to an inner circumferential surface of the first blower body 142. The plurality of first guide vanes 146 may be spaced apart from each other. The plurality of first guide vanes 146 may guide air, introduced into the first air-blowing passage 140*a* of the first blowing guider 140 after passing through the first fan 132, in an upward direction.

The first fan motor 134 may be supported on an upper side the first motor cover 144. Further, a rotating shaft of the first fan motor 134 may extend downwardly from the first fan motor 134 and may pass through a bottom surface of the first motor cover 144 to be coupled to the first hub 132*a*.

The first blower 100 may further include a base 180 provided under the lower case 110 and placed on the ground. The base 180 may be spaced apart downwardly from a lower end of the first case 110. A base suction part 114 may be formed in the separation space between the first case 110 and the base 180.

The air cleaner 10 includes a partition plate 160 provided between the first blower 100 and the second blower 200. By providing the partition plate 160, the second blower 200 may be spaced apart upwardly from the first blower 100.

The partition plate 160 may separate or block an air flow, generated by the first blower 100, from an air flow generated by the second blower 200. By providing the partition plate 160, the first and second blowers 100 and 200 may be vertically spaced apart from each other.

A separation space, in which the partition plate 160 is disposed, is formed between the first blower 100 and the second blower 200.

The partition plate 160 includes a first partition plate 162, and a second partition plate 164 disposed over the first partition plate 162. The first partition plate 162 extends rounded in the upward direction, and the second partition plate 164 extends rounded in the downward direction. The first partition plate 162 extends upwardly from the first discharge cover 150. At least a portion of the first partition plate 162 is formed as a curved surface having a predetermined radius of curvature. A PCB device (not shown) may be disposed in the partition plate 160.

The first discharge cover 150 of the first blower 100 is disposed under the partition plate 160, and a support plate 170 of the second blower 200 is disposed over the partition plate 160.

The second blower may further include the support plate 170 supporting the second filter 220 of the second blower 200. The support plate 170 has an approximately annular shape. The support plate is disposed on the second partition plate 164.

The support plate 170, having an annular shape, extends from an inner circumference to an outer circumference and is slightly inclined upwardly relative to the axial direction.

The second case 210 may have a cylindrical shape. An upper portion of the second case 210 may have a diameter which is smaller than a diameter of a lower portion thereof. The second case 210 has a second inlet 212, through which air is suctioned. The second inlet 212 is elongated vertically, and a plurality of second inlets 212 may be formed which are spaced apart from each other in a circumferential direction.

The plurality of second inlets 212 may be arranged evenly in the circumferential direction along the outer circumference of the second case 210, so that air may be suctioned in any direction relative to the second case 210.

The second blower 200 also includes the second filter 220 disposed on the second filter frame 222, and the same description of the first filter 120 and the first filter frame 122 applies to the second filter 220 and the second filter frame 222.

The second blower 200 includes: a second fan 232 disposed on an upper side of the second filter 220 and generating an air flow; a second fan motor 234 rotating the second fan; and a second fan housing 230 in which the second fan 232 is disposed. The second fan 232, the second fan motor 234, and the second fan housing 230 may have the same configuration with a similar shape, and may perform the same function, as the first fan 132, the first fan motor 134, and the first fan housing 130 described above. Accordingly, the second fan 232 may be a mixed flow fan, and may include a hub 232a, a shroud 232b, and a plurality of blades 232c, as in the first fan 132.

The second blower 200 may further include a second blowing guider 240 disposed on an upper side of the second fan 232 and guiding air, having passed through the second fan 232, in an upward direction. The second blowing guider 240 may include: a second blower body 242 having a cylindrical shape and forming the exterior thereof, and a bowl-shaped second motor cover 244 which is disposed at a center portion of the second blower body 242 and into which the second fan motor 234 is inserted, and a plurality of second guide vanes 246 which are spaced apart from each other in the circumferential direction on a second air-blowing passage 240a formed between the second blower body 242 and the second motor cover 244. The second blower body 242, the second motor cover 244, and the plurality of second guide vanes 246 may have the same configuration with a similar shape, and may perform the same function, as the first blower body 142, the first motor cover 144, and the plurality of first guide vanes 146 described above.

A second discharge cover 250, having a second outlet 252 which is open upwardly, may be disposed at an upper portion of the second blower 200. The second outlet 252 may have a ring shape. A second discharge grill 258 which is formed radially from the second outlet 252 may be disposed in the second discharge cover 250.

Figure 3:
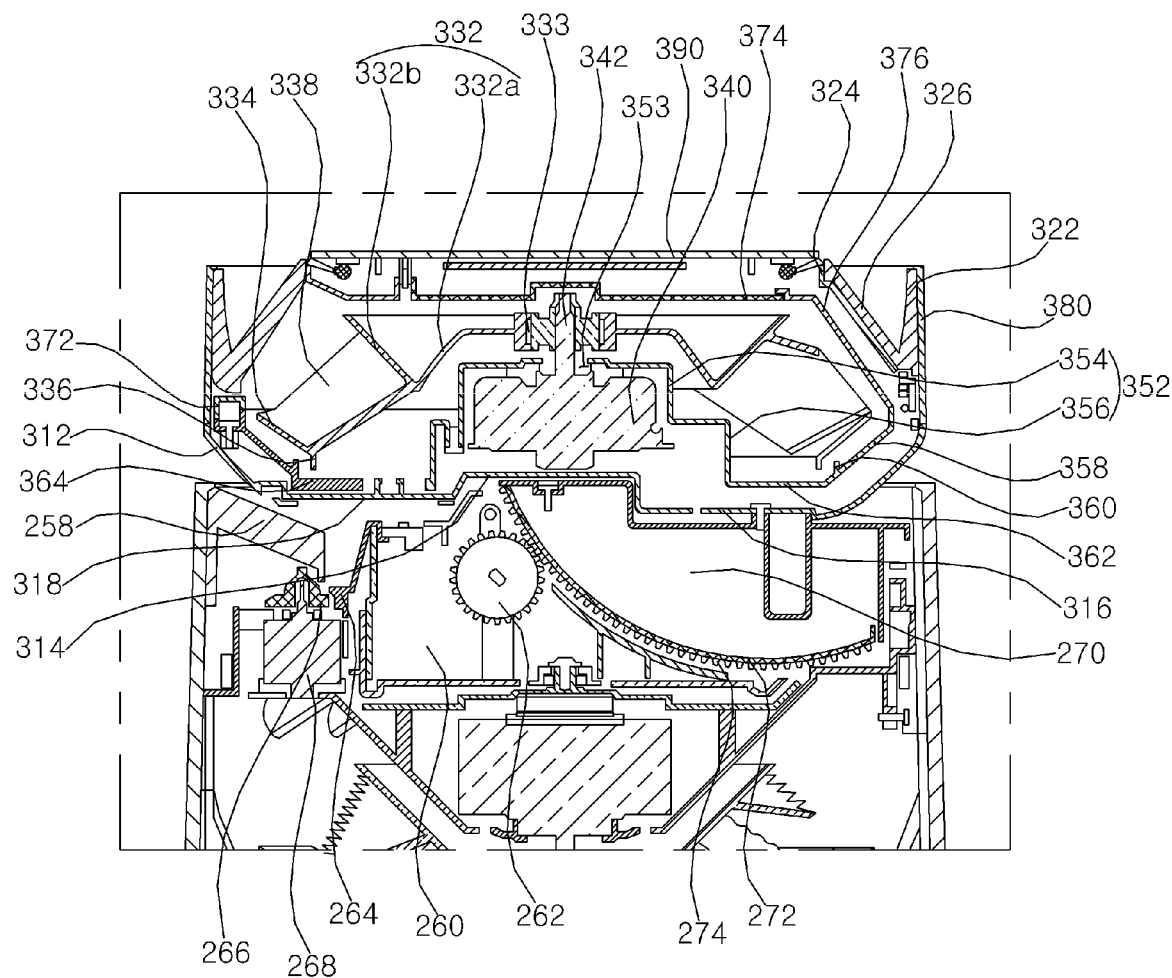
FIG. 3 is an enlarged view of a second blower and a circulator of FIG. 2.
Figure 4:
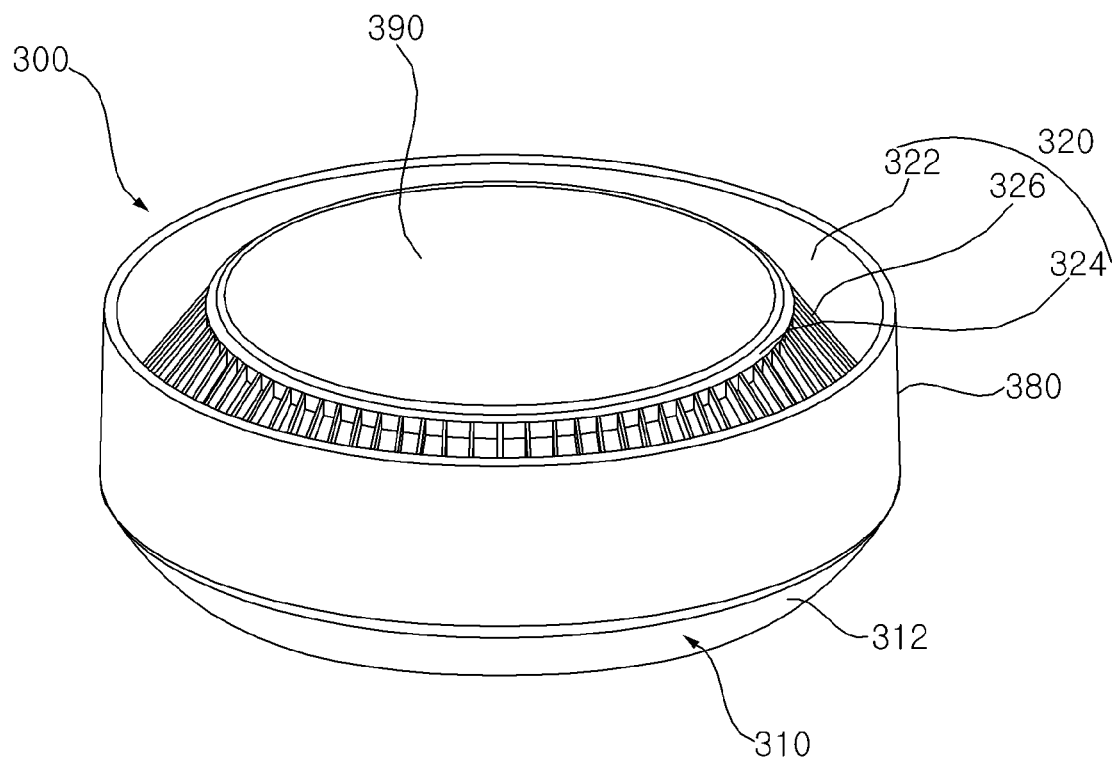
FIG. 4 is a perspective view of a circulator according to an embodiment of the present disclosure.
Figure 5:
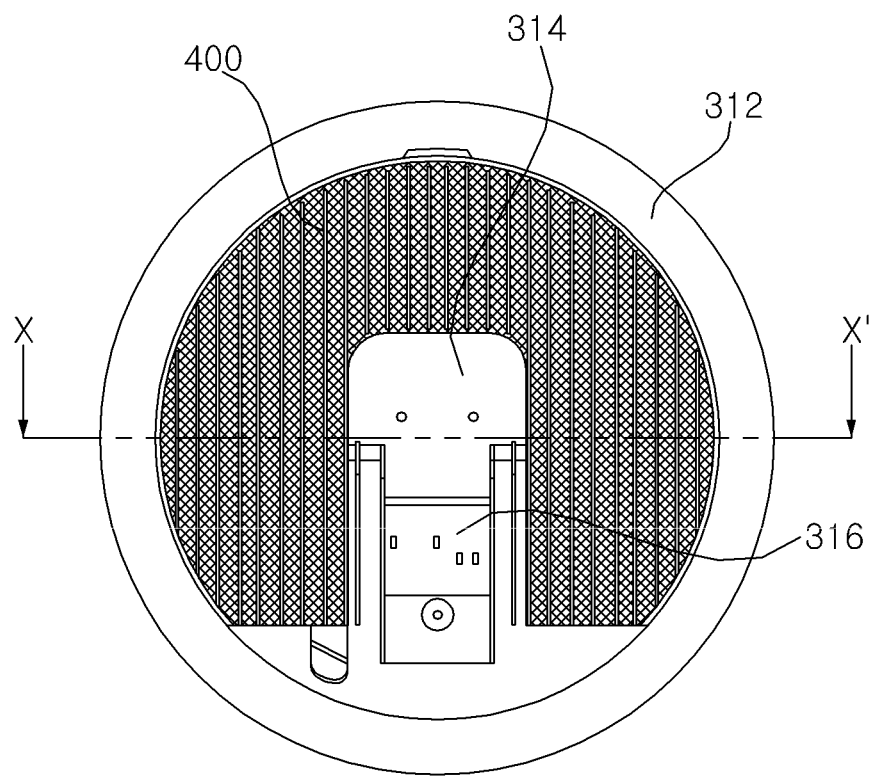
FIG. 5 is a bottom view of FIG. 4.

Referring to FIG. 3, the second discharge cover 250 may have an outer circumferential surface 254 disposed on an upper side of the second case 210 and forming a cylindrical edge, a guide base 256 disposed inside the outer circumferential surface 254, and a plurality of second discharge grills 258 extending radially from the guide base 256 to the outer circumferential surface 254.

The air cleaner 10 includes a moving guider 260 rotatably disposed on the guide base 256 and supporting the arrangement of the circulator 300, and a mover 270 moving along the moving guider 260 and changing an inclination angle of the circulator 300.

The moving guider 260, rotatably disposed on the guide base 256 and supporting the arrangement of the circulator 300, may be disposed on an upper side of the guide base 256. The moving guider 260 is rotatably disposed on the upper side of the guide base 256, and supports the arrangement of the circulator 300.

The guide base 256 may have a disc shape, and the second discharge grill 258 may be disposed around the guide base 256. The moving guider 260 may be rotatably disposed at the guide base 256. A space, in which a moving gear 262 and a gear motor (not shown) are disposed, may be formed in the moving guider 260.

The mover 270 is coupled to the circulator 300 and moves along the moving guider 260. The mover 270 may change an inclination angle of the circulator 300. The mover 270 includes a guide plate 272 which is convex toward the moving guider 260. A gear rail 274 engaged with the moving gear 262 may be formed on the guide plate 272.

The mover 270 is coupled to a lower surface of the circulator 300, thereby partially covering an inlet 310a formed on a lower part of the circulator 300. That is, the mover 270 partially covers the inlet 310a formed on the lower part of the circulator 300, thereby reducing the flow rate of air drawn into the circulator 300.

The moving guider 260 is rotatably disposed at the guide base 256. The moving guider 260 may be rotatably disposed at the center of the guide base 256. The moving guider 260 rotates about the center of the guide base 256, and may change a direction in which the circulator 300 is directed.

A rack gear 264 may be disposed on a circumference of one side of the moving guider 260.

A pinion gear 266, rotated while being engaged with the rack gear 264, and a motor 268 for driving the pinion gear 266 may be disposed on one side of the second discharge grill 258. The pinion gear 266 and the motor 268 may be disposed on a portion of an area in which the plurality of second discharge grills 258 are disposed.

The second filter 220 may have a cylindrical shape which is open at the top and the bottom. The second blower 200 further includes a second filter frame 222 forming a mounting space of the second filter 220.

The circulator 300 may be disposed on the upper side of the second blower 200. The circulator 300 may control a wind direction of air discharged upward from the second blower 200. The circulator 300 may be disposed parallel or inclined to a plane formed by the second outlet 252.

<Circulator>

The circulator according to an embodiment of the present disclosure will be described below with reference to FIGS. 3 to 9.

The circulator 300 may have an inlet 310a and an outlet 320a, and may cause filtered air, which is discharged from the second blower 200, to flow to a distant location.

The circulator 300 is disposed on the upper side of the second blower 200. An arrangement of the circulator 300 may be changed on the upper side of the second blower 200, and may cause the air, discharged upward by the second blower 200, to flow in a radial direction.

Figure 6:
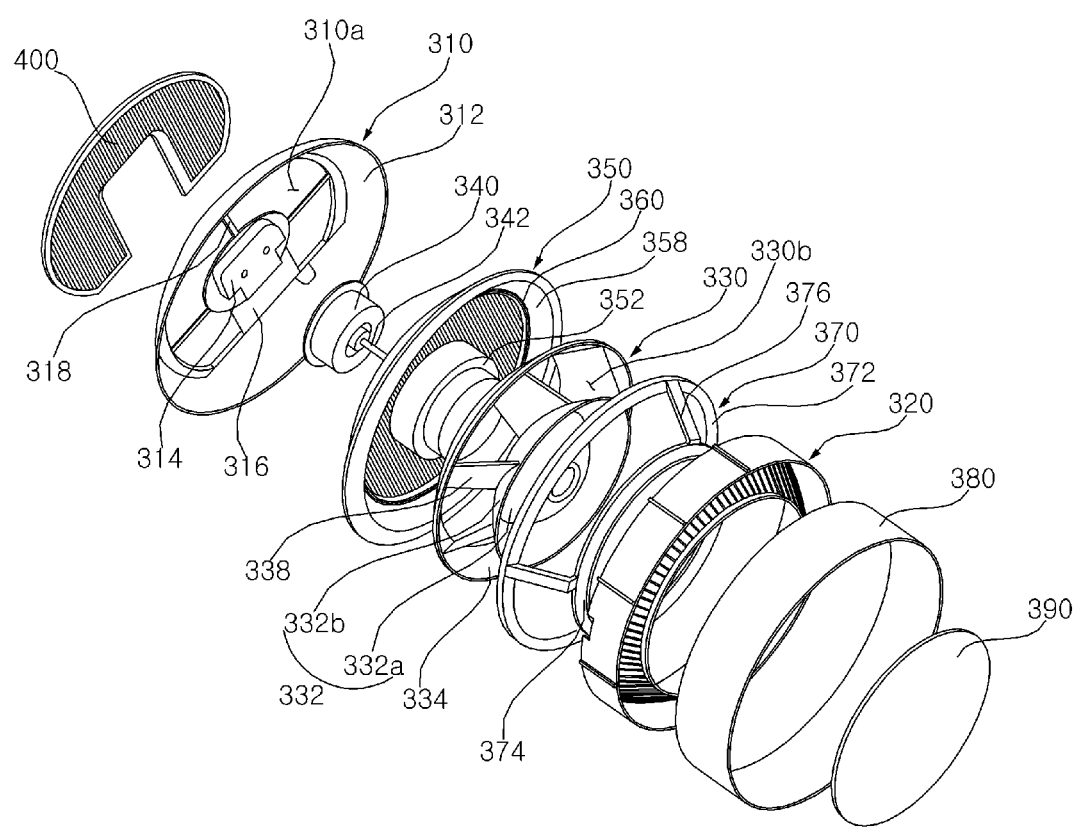
FIG. 6 is an exploded perspective view of FIG. 4.
Figure 7:
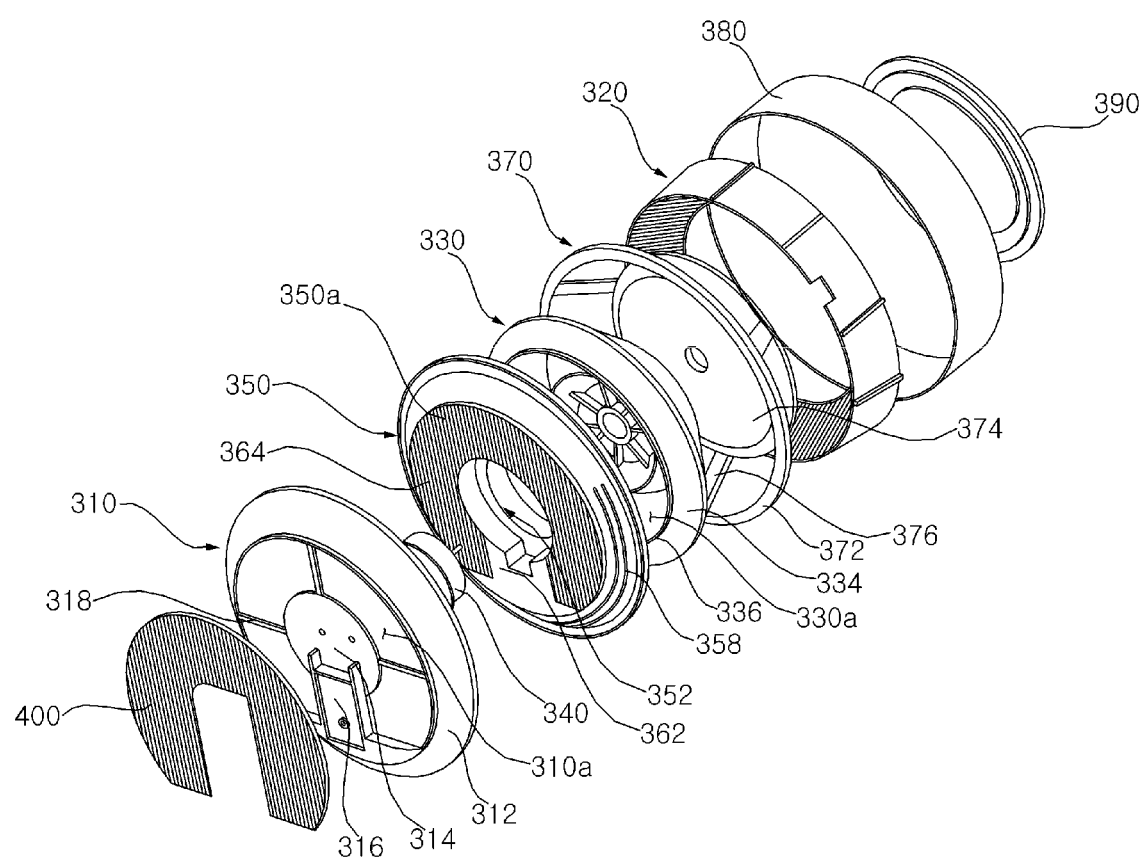
FIG. 7 is a rear perspective view of FIG. 6.

Referring to FIGS. 6 and 7, the circulator 300 may include: a lower cover 310 forming the inlet 310a; an upper cover 320 forming the outlet 320a; a blower fan 330 disposed between the lower cover 310 and the upper cover 320 and generating an air flow by rotation; a motor 340 disposed between the blower fan 330 and the lower cover 310, and rotating the blower fan 330; and a motor cover 350 disposed under the blower fan 330 and around the motor 340.

The circulator 300 includes: cases 310 and 320 having the inlet 310a, which is formed on a lower side and through which air discharged from the second outlet 252 is introduced, the outlet 320a through which the introduced air is discharged to the outside, and an outer wall disposed on the outside between the inlet 310a and the outlet 320a; a blower fan 330 disposed inside the cases 310 and 320, and including a hub 332, a shroud 334 disposed below the hub 332, and a plurality of blades 338 disposed between the hub 332 and the shroud 334; a motor 340 disposed below the hub 332 and rotating the blower fan 330; and a motor shaft 342 extending upwardly from the motor 340 and connecting the motor 340 and the hub 332.

The cases 310 and 320 of the circulator 300 may further include an outer cover 380 as a component that includes the lower cover 310 and the upper cover 320. The outer wall of the cases may be the outer cover 380 or a discharge guider 322 of the upper cover 320 which will be described later.

Referring to FIGS. 6 and 7, the circulator 300 may further include: a filter 400 filtering the air flowing through the inlet 310a formed in the lower cover 310; a supporter 370 disposed between the upper cover 320 and the blower fan 330, and supporting the upper cover 320; the outer cover 380 covering the outside of the discharge guider 322 of the upper cover 320; and a display 390 disposed over the supporter 370 and displaying an operation or status of the air cleaner 10.

As the blower fan 330, a mixed flow fan may be used which has a circular inlet 330a formed on a lower side thereof, and an annular outlet 330b formed on an upper side thereof. The blower fan 330 draws in air through the inlet 330a formed at the lower side thereof and discharges the air through the outlet 330b which is inclined radially upwardly. The inlet 330a of the blower fan 330 is disposed on an upper side of the lower cover 310.

Accordingly, the inlet 330a of the blower fan 330 may be partially covered by a lower plate 314 of the lower cover 310 which will be described later. A vortex is formed on an upper side of the lower plate 314 of the lower cover 310, which may be a factor in interrupting the flow of air drawn in through the inlet 330a of the blower fan 330.

Referring to FIG. 3, the blower fan 330 may include the hub 332 having a center to which the motor shaft 342 is coupled; the shroud 334 spaced apart from the hub 332 and having a center portion at which the inlet 330a for sucking air is formed; and the plurality of blades 338 disposed between the hub 332 and the shroud 334.

The plurality of blades 338 are provided between the hub 332 and the shroud 334. An upper end of the blades 338 is coupled to a lower surface of the hub 332, and a lower end thereof is coupled to an upper surface of the shroud 334. The plurality of blades 338 are spaced apart from each other on the circumference of the hub 332 in a circumferential direction.

The hub 332 includes an inner hub 332a which is upwardly convex to form a space in which the motor 340, disposed below the hub 332, is disposed; and an outer hub 332b extending radially from the inner hub 332a and inclined upwardly.

The inner hub 332a may have an upwardly convex bowl shape. A motor connector 333, to which the motor shaft 342, coupled to the motor 340 to be rotated thereby, is coupled, may be disposed at the center of the inner hub 332a. The motor connector 333 may have a hollow inner portion which is open at the top and the bottom, and through which the motor shaft 342 passes to be coupled thereto.

The outer hub 332b may form an inclined surface which extends upwardly to a radially outer side. The outer hub 332b may guide the air, drawn in through the inlet 330a, to flow radially upwardly. The upper end of the blades 338 is coupled to the lower surface of the outer hub 332b.

The circular inlet 330a, through which air is drawn in, is formed at the center of the shroud 334. The shroud 334 is disposed below the hub 332. The shroud 334 is spaced apart downwardly from the outer hub 332b. The shroud 334 extends upwardly in a radial direction. A diameter 330aD of the inlet 330a formed in the shroud 334 is smaller than a diameter 310aD of the inlet 310a formed in the lower cover 310 and a diameter 350aD of an inlet 350a formed in the motor cover 350. The plurality of blades 338 are coupled to the upper surface of the shroud 334.

Figure 8:
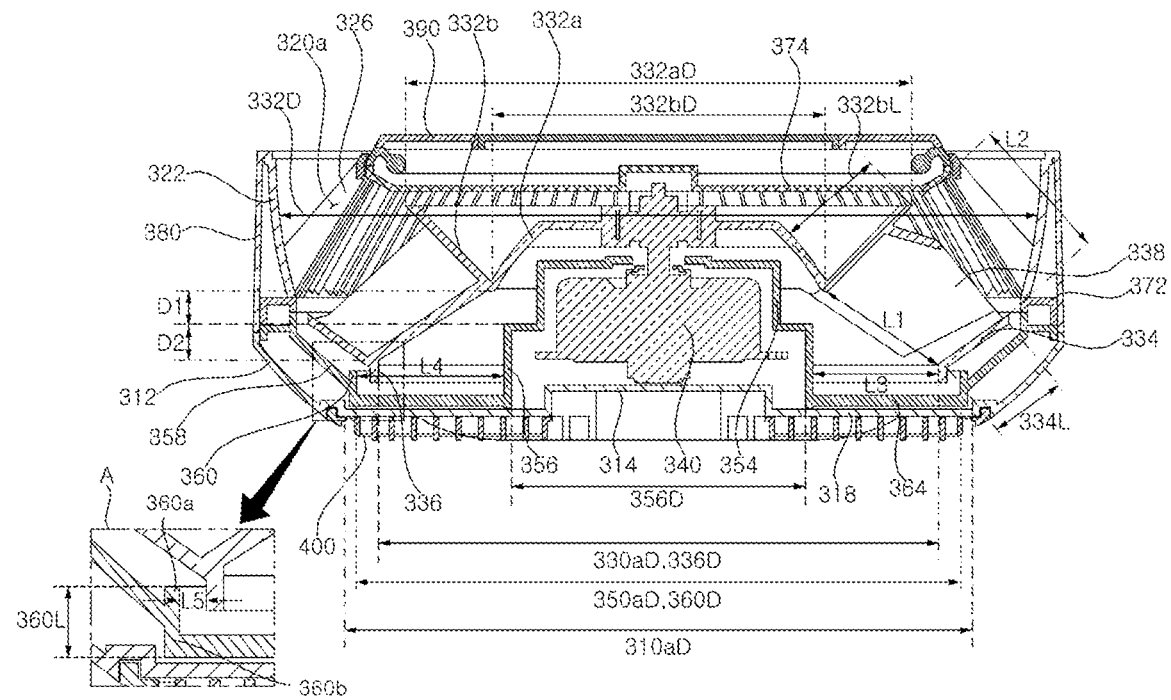
FIG. 8 is a cross-sectional view as taken along line X-X' of FIG. 5.

An outer circumferential end of the shroud 334 is inclined in a direction opposite to a direction of the inlet 330a. The outer circumferential end of the shroud 334 refers to a circumference of the upper end the shroud 334. The outer circumferential end of the shroud 334 is inclined upwardly so that air may be discharged in an upwardly inclined direction. Referring to FIG. 8, a direction in which the outer circumferential end of the shroud 334 is directed may be desirably parallel to a direction in which an outer circumferential end of the outer hub 332b is directed, or may be desirably inclined downwardly from the direction in which the outer circumferential end of the outer hub 332b is directed. Accordingly, a distance L1 between the inner circumferential end of the shroud 334 and the inner circumferential end of the outer hub 332b may be shorter than a distance L2 between the outer circumferential end of the shroud 334 and the outer circumferential end of the outer hub 332b.

A length 334L ("length of the shroud") extending from the inlet 330a of the shroud 334 to the outer circumferential end thereof is shorter than a length 332b L ("length of the outer hub") extending from the inner circumferential end of the outer hub 332b to the outer circumferential end thereof.

The outer circumferential end of the shroud 334 is disposed below the inner circumferential end of the outer hub 332b. The outer circumferential end of the outer hub 332b is disposed closer to a rotation axis of the blower fan 330 than the inner circumferential end of the shroud 334. The diameter 330aD of the inner circumferential end of the shroud 334 may be greater than a diameter 332D of the outer circumferential end of the outer hub 332b.

The blower fan 330 includes a suction guider 336 protruding downwardly from the inner circumferential end of the shroud 334. The suction guider 336 extends downwardly from a portion where the inlet 330a is formed, and an upper end and a lower end thereof may have the same diameter. The motor 340 and the housing 352, disposed around the motor 340, are disposed at the inlet 330a formed in the suction guider 336.

A distance L3 between the suction guider 336 and a lower housing 356 of the motor cover 350, which will be described below, may be approximately similar to the distance L1 between the inner circumferential end of the shroud 334 and the inner circumferential end of the outer hub 332b. The distance L3 between the lower housing 356 and the suction guider 336 may be 0.9 to 1.1 times the distance L1 between the inner circumferential end of the shroud 334 and the inner circumferential end of the outer hub 332b. The distance L3 between the lower housing 356 and the suction guider 336 is smaller than the distance L2 between the outer circumferential end of the shroud 334 and the outer circumferential end of the outer hub 332b. A distance L4 between the lower housing 356 and a bell mouth 360, which will be described below, is greater than the distance L1 between the inner circumferential end of the shroud 334 and the inner circumferential end of the outer hub 332b.

Referring to FIG. 3, the motor 340 is disposed under the blower fan 330. The motor 340 is disposed in a space formed under the inner hub 332a, and is coupled to the motor connector 333 of the inner hub 332a. The motor 340 has the motor shaft 342 extending upwardly and coupled to the hub 332. The motor 340 is disposed on an upper side of the lower cover 310. The motor 340 is disposed on an upper side of a lower plate 314 of the lower cover 310 which will be described below. Accordingly, the motor 340 does not interrupt the flow of air drawn in through the inlet 310a of the lower cover 310 and flowing to the blower fan 330.

The motor 340 is disposed on the upper side of the lower plate 314 of the lower cover 310 which will be described below. The motor 340 is fixedly disposed on the upper side of the lower plate 314. The motor 340 may be fixed to the lower cover 310 or the motor cover 350. Referring to FIG. 3, the motor 340 is fixed to the motor cover 350. However, in another example, the motor 340 may also be fixed to the lower plate 314 of the lower cover 310.

The motor 340 is disposed in a lower space of the inner hub 332a of the blower fan 330. The motor 340 may be disposed at the inlet 330a formed in the shroud 334. The motor 340 is disposed on the upper side of the lower plate 314, thereby preventing the formation of a vortex above the inlet 310a covered by the lower plate 314. The motor 340 may be fixedly disposed in the motor cover 350 which will be described below.

Referring to FIG. 7, the motor cover 350 is disposed under the blower fan 330 and forms a space in which the motor 340 is disposed. The motor cover 350 has the inlet 350a, through which air flows to the inlet 330a of the blower fan 330. A plurality of grills 364 are disposed at the inlet 350a formed in the motor cover 350. The plurality of grills 364 may be arranged alternately in a vertical direction.

Figure 9:
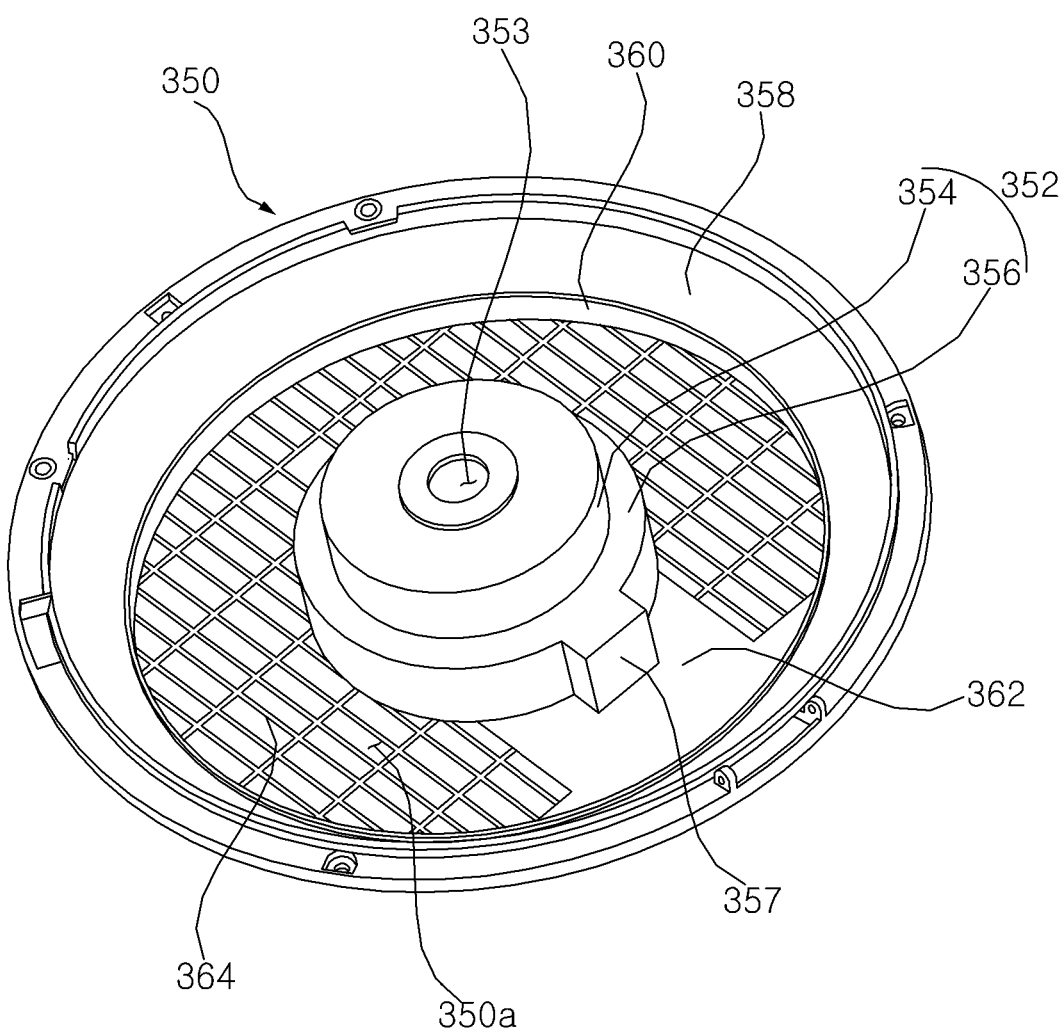
FIG. 9 is a perspective view of a motor cover according to an embodiment of the present disclosure.

Referring to FIG. 9, the motor cover 350 includes: the housing 352 forming a space in which the motor 340, disposed under the blower fan 330, is disposed; an inner plate 358 spaced apart radially outwardly from the housing 352, and disposed under the shroud 334; the grills 364 disposed at the inlet 350a formed between the inner plate 358 and the housing 352; and the bell mouth 360 protruding upwardly from the inner circumferential end of the inner plate 358.

The motor cover 350 may further include a first connection plate 362 disposed across the inlet 350a formed in the motor cover 350, to connect the housing 352 and the inner plate 358. The first connection plate 362 extends radially outwardly from the housing 352 to be connected to the inner plate 358. The inlet 350a formed in the motor cover 350 may have a ring shape which is partially closed by the first connection plate 362.

The housing 352 forms a space in which the motor 340 is disposed. The housing 352 is disposed on an upper side of the lower plate 314 of the lower cover 310, which will be described below, to guide the air flowing through the inlet 310a of the lower cover 310. The housing 352 may prevent the formation of a vortex above the lower plate 314. The housing 352 extends upwardly from the upper side of the lower plate 314, to guide the air flowing through the inlet 310a of the lower cover 310.

The housing 352 includes an upper housing 354 disposed under the inner hub 332a of the blower fan 330, and a lower housing 356 disposed under the upper housing 354.

The upper housing 354 is disposed in a lower space formed by the inner hub 332a. The upper housing 354 has a hollow inner portion and a cylindrical shape with an open bottom. A hole 353, through which the motor shaft 342 of the motor 340 passes, is formed on an upper surface of the upper housing 354.

The lower housing 356 has a greater diameter than the upper housing 354 and extends downwardly. In a region where the inlet 350a is formed, a diameter 356D of an outer circumferential end of the lower housing 356 is smaller than a diameter 332b D of the inner circumferential end of the outer hub 332b. The upper end of the lower housing 356 is disposed below the inner circumferential end of the outer hub 332b, and is disposed above the inner circumferential end of the shroud 334. The distance D1 that the upper end of the lower housing 356 and the inner circumferential end of the outer hub 332b are spaced apart from each other in an up-down direction is shorter than the distance D2 that the upper end of the lower housing 356 and the inner circumferential end of the shroud 334 are spaced apart from each other in the up-down direction. A circumferential surface of the lower housing 356 may guide the air, flowing upwardly through the inlet 350a of the motor cover 350, in a direction toward the outer hub 332b.

The lower housing 356 protrudes in a direction in which the inlet 350a of the motor cover 350 is not formed, such that a protrusion 357 may be formed in which a wire adapter (not shown) connected to the motor 340 is disposed. The motor 340 may be coupled to the lower housing 356 by a separate coupling member (not shown). The motor 340 is fixedly disposed in the housing 352. The motor 340 may be spaced apart upwardly from the lower housing 356.

The upper housing 354 may be disposed in a space formed under the inner hub 332a which is convex upwardly. A diameter of the upper housing 354 is shorter than a diameter of the inner circumferential end of the outer hub 332b.

Referring to FIG. 8, the inner plate 358 forms a space in which a lower portion of the blower fan 330 is received. The inlet 350a, through which air flows to the blower fan 330, is formed inside the inner plate 358. The inner plate 358 is disposed under the shroud 334 of the blower fan 330.

The bell mouth 360, protruding upwardly from a portion adjacent to the inlet 350a of the motor cover 350, is disposed on the inner plate 358. The bell mouth 360 protrudes upwardly from the inner circumferential end of the inner plate 358.

The bell mouth 360 has a ring shape and is spaced apart outwardly from the suction guider 336 of the shroud 334. The bell mouth 360 may guide the air, flowing through the inlet 350a of the motor cover 350, toward the inlet 330a of the blower fan 330.

The bell mouth 360 may be disposed approximately parallel to the suction guider 336 of the shroud 334. The upper end of the bell mouth 360 is disposed above the lower end of the suction guider 336. The bell mouth 360 is disposed radially outwardly of the suction guider 336. A diameter 360D of the bell mouth 360 is greater than a diameter 336D of the suction guider 336.

Referring to FIGS. 6 and 7, the lower cover 310 is disposed below the motor 340 and the motor cover 350. The lower cover 310 covers the blower fan 330 and a lower side of the motor 340. The inlet 310a, through which outside air is drawn in, is formed in the lower cover 310 at a position below the inlet 350a formed in the motor cover 350.

Referring to FIG. 7, the lower cover 310 includes: an outer plate 312 disposed under the inner plate 358 of the motor cover 350; the lower plate 314 spaced apart radially inwardly from the outer plate 312, and covering a lower side of the motor 340; a second connection plate 316 disposed under the first connection plate 362 of the motor cover 350 and connecting the lower plate 314 an the outer plate 312; and a plurality of ribs 318 disposed at the inlet 310a formed between the lower plate 314 and the outer plate 312, and connecting the lower plate 314 and the outer plate 312.

Referring to FIG. 8, the outer plate 312 is disposed under the inner plate 358 of the motor cover 350. The outer plate 312 has a shape extending upwardly toward a radially outer side. At least a portion of the outer plate 312 may have a curved surface shape which is convex outwardly. In the curved surface shape, a portion of air discharged upwardly flows along a surface where the outer plate 312 is formed, such that an air flow may be formed in a direction in which the outlet 320a of the circulator 300 is directed.

Referring to FIG. 7, the lower plate 314 covers the lower surface of the housing 352. The lower plate 314 has an approximately circular shape and has a lower side coupled to the mover 270 that changes an arrangement of the circulator 300. The lower plate 314 covers the center of the inlet 310a formed in the lower cover 310. That is, by the lower plate 314, the inlet 330a of the blower fan 330 is partially closed.

The lower plate 314, disposed below the inlet 330a of the blower fan 330, may interrupt the flow of air drawn in through the inlet 330a of the blower fan 330. Further, as the inlet 330a of the blower fan 330 is partially covered, a problem may occur in that a vortex may be formed in the air above the lower plate 314. However, in the present disclosure, the motor 340 is disposed above the lower plate 314, thereby minimizing an area in which a vortex may be formed in the air inside the inlet 330*a* of the blower fan 330.

In addition, the housing 352 surrounding the motor 340 is disposed on an upper side of the lower plate 314, thereby guiding air flowing between the shroud 334 and the outer hub 332*b* of the blower fan 330.

The second connection plate 316 extends radially outwardly from one side of the lower plate 314, and is connected to the outer plate 312. The second connection plate 316 may be coupled to the lower plate 314 and the mover 270.

The second connection plate 316 may be disposed under the first connection plate 362. The second connection plate 316 is spaced apart downwardly from the first connection plate 362. A space for a wire connected to the motor 340 or the display 390 may be formed between the second connection plate 316 and the first connection plate 362.

Referring to FIG. 7, a filter 400 may be disposed at a portion where the inlet 310*a* of the lower cover 310 is formed. The filter 400 is mounted at the lower cover 310 to filter the air flowing through the inlet 310*a* of the lower cover 310.

Referring to FIGS. 6 and 7, the upper cover 320 includes: a discharge guider 322 having a cylindrical shape and forming the exterior thereof; a connect ring 324 spaced apart radially inwardly from the discharge guider 322 and having a ring shape; and a plurality of vanes 326 disposed at the annular outlet 320*a* formed between the discharge guider 322 and the connect ring 324 and guiding the air, blown by the blower fan 330, in an upward direction.

Referring to FIG. 8, the annular outlet 320*a* is formed inside the discharge guider 322. The discharge guider 322 has a cylindrical shape and extends upwardly so that the air discharged from the blower fan 330 may flow upwardly. The discharge guider 322 may have a shape with a thickness in the radial direction decreasing from a lower end toward an upper end. Accordingly, a diameter 332D of the inner circumferential end of the discharge guider 322 may increase from the bottom toward the top.

Referring to FIG. 8, the connect ring 324 may be disposed at a position where the upper end of the discharge guider 322 is formed. The connect ring 324 may come into contact with the supporter 370 which will be described below. The annular outlet 320*a* may be formed between the connect ring 324 and the discharge guider 322.

The respective plurality of vanes 326 are connected to the discharge guider 322 and the connect ring 324 and may be spaced apart from each other in a circumferential direction. An outer end of the respective plurality of vanes 326 is connected to the lower end of the discharge guider 322, and an inner end thereof is connected to the connect ring 324. Accordingly, the respective plurality of vanes 326 may have a shape extending upwardly toward the center of the blower fan 330. In order to cancel a rotational component of the air blown by the blower fan 330, a lower end of the plurality of vanes 326 may form a curved surface, and a straight surface may be formed toward the top.

The plurality of vanes 326 may have a shape with a thickness decreasing from an outer end toward an inner end.

Referring to FIGS. 6 and 7, the supporter 370 includes: an outer frame 372 having a ring shape and disposed on an upper end of the inner plate 358 of the motor cover 350; an upper plate 374 having a disc shape and disposed above the hub 332 of the blower fan 330; and a connection frame 376 connecting the outer frame 372 and the upper plate 374 and supporting the upper plate 374.

Referring to FIG. 8, the outer frame 372 has a ring shape and is disposed over the upper end of the inner plate 358. The outer frame 372 has a cross-section with a downwardly open U-shape. A space for the wire may be formed between the outer frame 372 and the inner plate 358.

The upper plate 374 has a disc shape and is disposed to cover an upper side of the hub 332. The upper plate 374 may support the display 390 disposed on the upper side thereof. The upper plate 374 has a smaller diameter than the outer frame 372 and may be disposed above the outer frame 372.

The connection frame 376 may connect the outer frame 372 and the upper plate 374 and may support the upper plate 374.

Referring to FIG. 6, the outer cover 380 is disposed on an outer circumference of the discharge guider 322 of the upper cover 320. The outer cover 380 has a cylindrical shape which is open at the top and the bottom.

Referring to FIG. 6, the display 390 is disposed over the upper plate 374. The display 390 has a touch panel to receive a user command. The display 390 may display an operating state of the air cleaner 10 or environment information of an indoor space for a user.

EFFECTS

The following description will be given of differences during the operation of the circulator in structures of the present disclosure of FIG. 10A and the comparative example of FIG. 10B.

TABLE 1

|  | Comparative example | Present disclosure |
|---|---|---|
| Rotation speed (RPM) | 870 | 870 |
| Air volume (CMM) | 4.5 | 4.8 |
| Power consumption (W) | 9.0 | 8.5 |
| Arrival distance (m) | 8 | 9 |

Figure 10A:
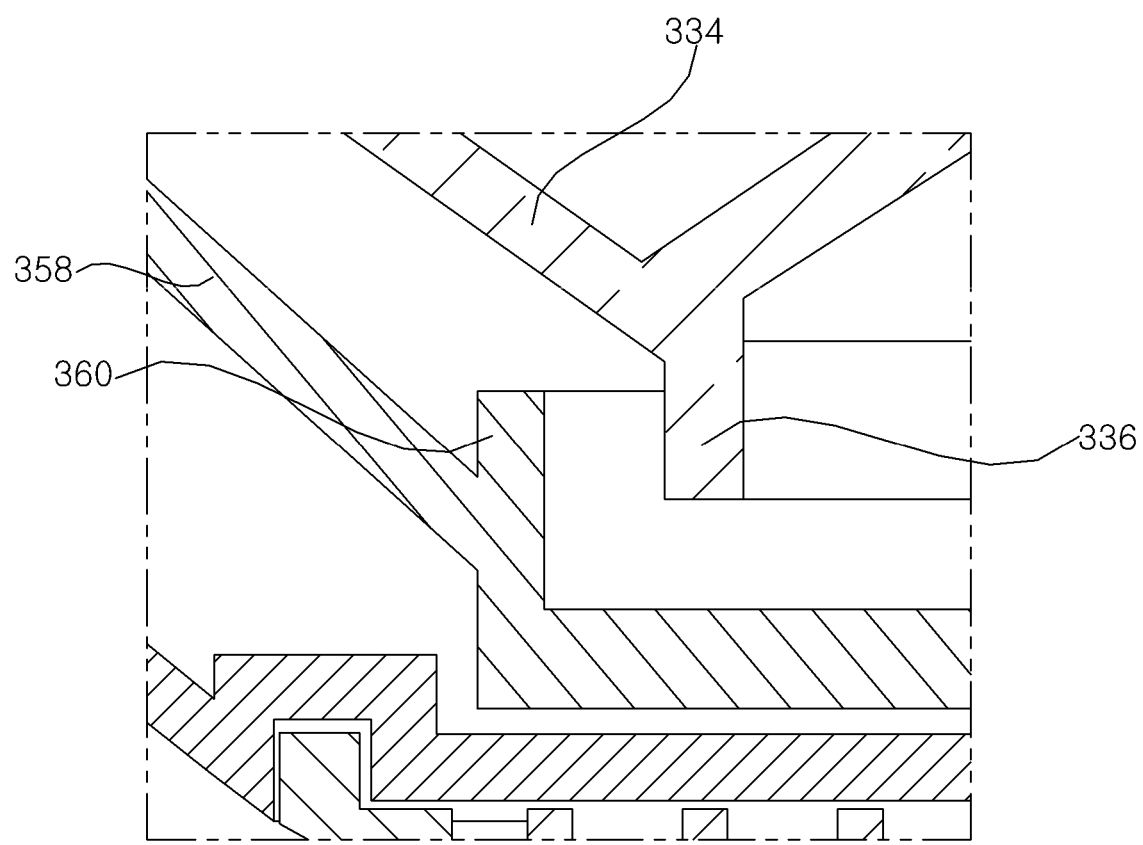
FIG. 10A is an enlarged view of portion A of FIG. 8.
Figure 10B:
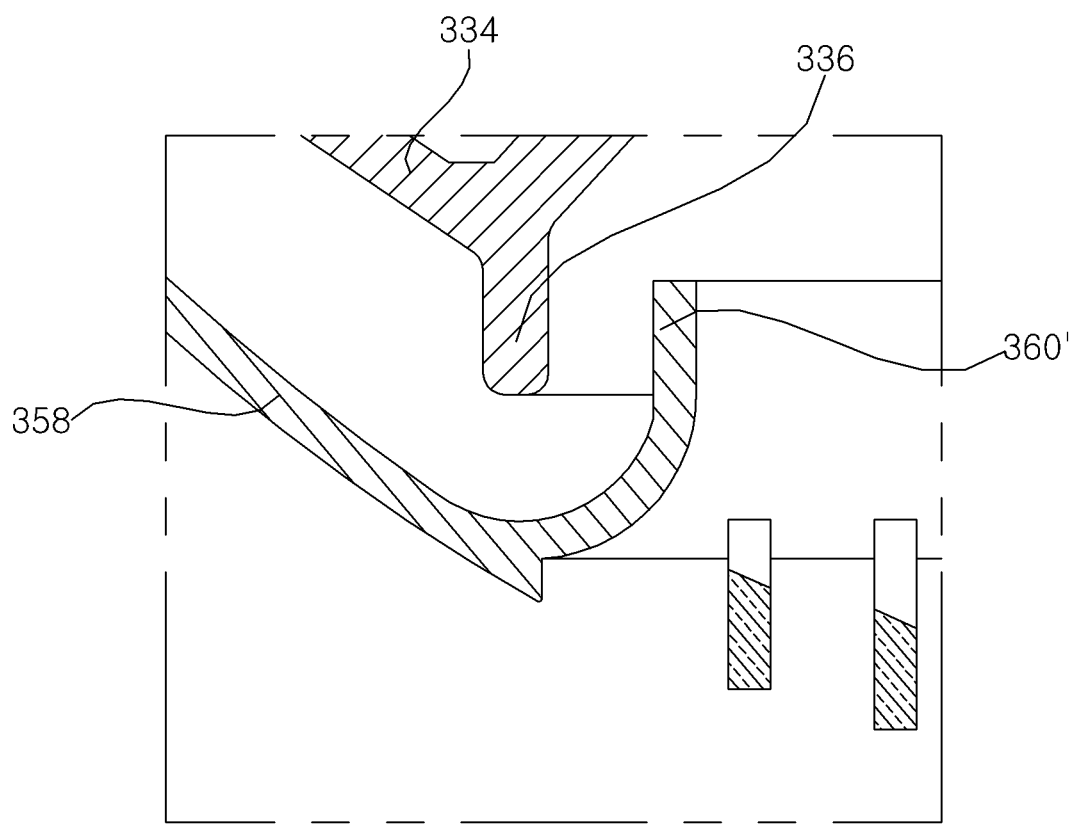
FIG. 10B is a cross-sectional view of another arrangement of a bell mouth as a comparative example of FIG. 10A.

The above Table 1 shows data during the operation of the circulator in the bell mouth 360, disposed outside of the suction guider 336 according to the present disclosure as illustrated in FIG. 10A, and in a bell mouth 336' disposed inside of the discharge guider 336 as illustrated in FIG. 10B.

In a structure where the inlet 330*a* of the blower fan 330 is partially covered by the lower plate 314 of the lower cover 310 as in the present disclosure, if the bell mouth 360 is disposed inside of the discharge guider 336, the bell mouth 360 may cause a reduction in the volume of air drawn into the blower fan 330.

As illustrated in FIG. 10A, it can be seen from Table 1 that when the bell moth 360 is disposed outside of the suction guider 336, an air volume increases even at the same rotation speed, compared to the structure of FIG. 10B. Further, as the volume of air passing through the blower fan 330 increases, a distance reached by the air blown by the blower fan 330 may also increase. The result can be seen from Table 1, in which an arrival distance when the circulator in FIG. 10A of the present disclosure is used increases compared to an arrival distance when the circulator in the comparative example of FIG. 10B is used.

In addition, the bell mouth 360' disposed inside of the suction guider 336 may act as a resistance to the air drawn into the blower fan 330, thereby increasing the power consumption during the operation of the blower fan 330. It can be seen from Table 1 that when the bell mouth 360 of the present disclosure is disposed outside of the suction guider 336, the power consumption of the blower fan 330 is relatively low.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. An air cleaner comprising:
   a blower having an outlet defined at an upper side thereof;
   a circulator that is disposed on the blower and that includes a blower fan, the circulator having (i) an inlet defined at a bottom side of the circulator and (ii) an outlet defined at an upper side of the circulator; and
   a mover coupled to the circulator and configured to change an arrangement of the circulator,
   wherein the blower fan comprises:
      a hub including (i) an inner hub disposed at a center of the hub and (ii) an outer hub that is disposed at an edge of the hub and that extends radially and upwardly from the inner hub,
      a shroud that is spaced apart downwardly from the outer hub and that extends radially and upwardly from a bottom edge of the shroud, and
      a plurality of blades that are positioned between the outer hub and the shroud and that are coupled to the hub and the shroud,
   wherein the circulator further comprises:
      a lower cover that is disposed below the blower fan, the lower cover comprising a lower plate that is disposed at a center of the lower cover and that is coupled to the mover, and the lower cover having the inlet that is defined around the lower plate and that extends in a radial direction of the blower fan,
      an upper cover disposed above the blower fan and having the outlet of the circulator, and
      a motor disposed between the inner hub and the lower cover, the motor having a rotation shaft coupled to the inner hub, and
   wherein the motor is fixed to an upper side of the lower plate.

2. The air cleaner of claim 1, wherein the circulator further comprises a motor housing disposed around the motor, and extending in a direction from the inlet of the lower cover toward the blower fan.

3. The air cleaner of claim 2, wherein the motor housing is configured to guide air, drawn in through the inlet formed in the lower cover, toward the blower fan.

4. The air cleaner of claim 2, wherein the motor housing is configured to guide the air, flowing through the inlet formed in the shroud, toward the hub.

5. The air cleaner of claim 2,
   wherein an upper end of the plurality of blades is coupled to a lower surface of the outer hub, and
   wherein a lower end of the plurality of blades is coupled to an upper surface of the shroud.

6. The air cleaner of claim 2, wherein the inner hub is upwardly convex and defines a space in which the motor is disposed.

7. The air cleaner of claim 2, wherein an outer circumferential end of the shroud is disposed below an inner circumferential end of the outer hub.

8. The air cleaner of claim 2, wherein:
   the motor housing has a cylindrical shape; and
   a diameter of an outer circumferential end of the motor housing is smaller than a diameter of an inner circumferential end of the outer hub.

9. The air cleaner of claim 6, wherein the motor housing comprises an upper housing disposed below the inner hub, and a lower housing extending downward from the upper housing,
   wherein the lower housing has a greater diameter than the upper housing.

10. The air cleaner of claim 9, wherein the lower housing is disposed below the hub, so as to guide air, drawn in through the inlet of the lower cover, toward the outer hub.

11. The air cleaner of claim 9, wherein a diameter of an outer circumferential end of the lower housing is smaller than a diameter of an inner circumferential end of the outer hub.

12. The air cleaner of claim 9, wherein an upper end of the lower housing is disposed below an inner circumferential end of the outer hub and above an inner circumferential end of the shroud.

13. The air cleaner of claim 12, wherein a distance that the upper end of the lower housing is spaced apart downwardly from the inner circumferential end of the outer hub is shorter than a distance that the upper end of the lower housing is spaced apart upwardly from the inner circumferential end of the shroud.

14. The air cleaner of claim 9, wherein the upper housing is disposed in a lower space formed by the inner hub.

15. The air cleaner of claim 2, wherein the circulator further comprises an inner plate spaced apart radially outwardly from the motor housing, and disposed below the shroud, and
   wherein the inlet of the circulator is configured to provide to the blower fan and is defined between the motor housing and the inner plate.

16. The air cleaner of claim 15, wherein the motor cover comprises a bell mouth protruding upwardly from an inner circumferential surface of the inner plate, so as to guide air, flowing through the inlet formed in the lower cover, toward the inlet of the blower fan.

17. The air cleaner of claim 16, wherein a diameter formed by an inner circumferential surface of the bell mouth is greater than a diameter of the inlet formed in the blower fan.

18. The air cleaner of claim 16, wherein the blower fan further comprises a suction guider protruding downwardly from an inner circumferential end of the shroud, and
   wherein the bell mouth is spaced apart outwardly from a circumferential surface of the suction guider.

19. The air cleaner of claim 1, wherein the upper cover comprises:
   a discharge guider that defines a cylindrical exterior of the upper cover; and
   a plurality of vanes that extends radially inwardly from the discharge guider and that is configured to guide air, blown by the blower fan, in an upward direction.

20. The air cleaner of claim 19, wherein the upper cover further comprises a connect ring having a ring shape and spaced apart radially inwardly from the discharge guider,
   wherein the plurality of vanes are spaced apart from each other in a circumferential direction between the discharge guider and the connect ring.

21. The air cleaner of claim 19, wherein the discharge guider has an annular outlet formed therein, wherein a diameter formed by an inner circumferential end of the discharge guider increases from bottom to top.

22. An air cleaner comprising:

a blower having an outlet formed on an upper side thereof; and a circulator disposed above the blower and configured to control a wind direction of air flowing upwardly through the outlet of the blower, the circulator comprising a blower fan, wherein the blower fan comprises:
- a hub including (i) an inner hub disposed at a center of the hub and (ii) an outer hub that is disposed at an edge of the hub and that extends radially and upwardly from the inner hub,
- a shroud that is spaced apart downwardly from the outer hub and that extends radially and upwardly from a bottom edge of the shroud, and
- a plurality of blades that are positioned between the outer hub and the shroud and that are coupled to the hub and the shroud, wherein the circulator further comprises:
- an upper cover that is disposed above the blower fan, the upper cover defining an outlet of the circulator and being configured to guide air blown by the blower fan in a direction in which a rotation axis of the blower fan is directed,
- a motor disposed below the inner hub and configured to rotate the blower fan, and
- a motor cover including a housing that is disposed below the inner hub and around the motor and that is surrounded by the shroud, the motor cover defining an inlet of the circulator around a lower end of the housing, and wherein the motor is disposed above the inlet of the circulator.

* * * * *